US006842896B1

United States Patent
Redding et al.

(10) Patent No.: US 6,842,896 B1
(45) Date of Patent: Jan. 11, 2005

(54) SYSTEM AND METHOD FOR SELECTING A SERVER IN A MULTIPLE SERVER LICENSE MANAGEMENT SYSTEM

(75) Inventors: Mark E. Redding, Newport Beach, CA (US); Logan A. Badia, Fullerton, CA (US); Sandeep Handa, New Delhi (IN); Hemant Sharma, Lake Forest, CA (US); Sanjay Chopra, New Delhi (IN); Vikram Duvvoori, Salinas, CA (US); Shankar Ramamoorthy, Santa Cruz, CA (US); Ajay Tripathy, New Delhi (IN)

(73) Assignee: Rainbow Technologies, Inc., Irvine, CA (US)

( * ) Notice: Subject to any disclaimer, the term of this patent is extended or adjusted under 35 U.S.C. 154(b) by 773 days.

(21) Appl. No.: 09/648,853

(22) Filed: Aug. 25, 2000

Related U.S. Application Data

(60) Provisional application No. 60/152,785, filed on Sep. 7, 1999.

(51) Int. Cl.[7] .............................. G06F 9/44; H04L 9/00
(52) U.S. Cl. ........................ 717/172; 717/174; 713/155
(58) Field of Search ................................ 717/172, 174, 717/177; 713/155, 161, 176; 709/225; 705/59

(56) References Cited

U.S. PATENT DOCUMENTS

| | | | |
|---|---|---|---|
| 4,652,990 A | 3/1987 | Pailen et al. | |
| 4,658,093 A | 4/1987 | Hellman | |
| 4,685,055 A | 8/1987 | Thomas | |
| 4,754,395 A | 6/1988 | Weisshaar et al. | |
| 4,780,821 A | 10/1988 | Crossley | |
| 4,791,565 A | 12/1988 | Dunham et al. | |
| 4,796,220 A | 1/1989 | Wolfe | |
| 5,138,712 A | 8/1992 | Corbin | |
| 5,146,575 A | 9/1992 | Nolan, Jr. | |
| 5,390,297 A | 2/1995 | Barber et al. | |
| 5,579,222 A | * 11/1996 | Bains et al. | 717/167 |
| 5,745,879 A | 4/1998 | Wyman | |
| 5,752,041 A | * 5/1998 | Fosdick | 717/178 |
| 5,790,664 A | 8/1998 | Coley et al. | |
| 5,845,065 A | * 12/1998 | Conte et al. | 713/200 |
| 5,862,348 A | 1/1999 | Pedersen | |
| 5,903,650 A | * 5/1999 | Ross et al. | 705/59 |
| 6,189,146 B1 | * 2/2001 | Misra et al. | 717/177 |
| 6,574,612 B1 | * 6/2003 | Baratti et al. | 705/59 |

FOREIGN PATENT DOCUMENTS

GB  2316503  2/1998

OTHER PUBLICATIONS

PC Week, "Strength in Numbers", vol. V3, Jul. 1986, p. 57.
Digital Review, "Apollo Licenses Concurrent Users on Entire Network", vol. 4, No. 20, Oct. 26, 1987, p. 6.

(List continued on next page.)

*Primary Examiner*—Krisna Lim
(74) *Attorney, Agent, or Firm*—Gerald T. Bodner

(57) ABSTRACT

A system for managing licenses for protected software on a communication network is disclosed. The system comprises at least one client computer and a pool of license servers coupled to the communication network. The client computers request authorization to use the protected software, and the license servers manage a distribution of allocations to use the protected software. The pool of license servers includes a selected current leader server for managing the distribution of allocations for all license servers in the pool. The first license server to be started is selected as the current leader server. However, if no license server is started first, the license server with the highest priority according to a leader priority list is selected as the current leader server. In addition, client computers seeking authorization to use the protected software may receive information from the server pool and select a particular license server from which to request authorization to use the protected software based on the received information.

16 Claims, 4 Drawing Sheets

OTHER PUBLICATIONS

IBM Technical Disclosure Bulletin, "Software Serial Number", vol. 26, No. 7B, Dec. 1983, pp. 3918–3919.

Chovan, J., "Handling Site–License Agreements and Public Domain Software Packages: What are the Issues?", ACM SIGUCCS Conference, Toledo, Ohio, Sep. 30–Oct. 4, 1985, pp. 175–179.

Brown, B., "Microcomputer Software Exchange at Michigan State University", ACM SIGUCCS Conference, Toledo, Ohio, Sep. 30–Oct. 4, 1985, pp. 185–197.

Halaris, A., Sloan, L., "Networked Microcomputers: New Challenges For Computing Center Management", SIGUCCS Newsletter, vol. 13, No. 4, Winter 1983, pp. 20–26.

Gerber, H., Pringle, G., "Instructional Computing and Local Area Networking", SIGUCCS Newsletter, vol. 17, No. 2, Summer 1987, pp. 8–13.

Kreutzer, A., "An On–Line System For Controlling and Monitoring Software Usage in a Microcomputer Laboratory", SIGUCCS Newsletter, vol. 18, No. 2, Summer 1988, pp. 29–32.

Allen, K., "Software Lending Library", ACM–SIGUCCS XII, Conference Proceedings, Nov., 1984, pp. 171–172.

InfoWorld, "FST Introduces a Copy Protection Scheme For Nets", vol. 7, No. 7, Nov. 25, 1985, p. 14.

Micro Communications, "Software Protection", vol. 2, No. 5, May, 1985, pp. 35–37.

PC World, "LAN Licensing Lags", vol. 3, No. 11, Nov. 1985, pp. 320, 324, 328.

Rifkin, A. et al, "RFS Structural Overview", USENIX Summer Conference Proceedings, Atlanta, Ga., Jun. 9–13, 1986, pp. 248–259.

Gould, E., "The Network File System Implemented on 4.3BSD", USENIX Conference, Atlanta, Ga., Jun. 9–13, 1986, pp. 294–298.

Software News, "The Promise of LANS: MIS Back in Control", pp. 51–54, 56–58.

IBM Technical Disclosure Bulletin, "Device/Profile Installation Procedure with Validation", vol. 28, No. 4, Sep. 1985, p. 1487.

The DEC Professional, "PACS Plus Relief for VAX/VMS Resource Management Headaches", Feb. 1986, pp. 58–62, 64.

Software News, "LAN Applications Prices Are Not Easy to Set", Apr. 1987, pp. 54, 56, 58.

SIGUCCS Newsletter, "Licensing of Microcomputer Software", vol. 15, No. 4, Winter 1985, pp. 9–12.

AMC–SIGUCCS User Services Conference IX, "A Software Management System", Atlanta, Ga., Oct. 11–14, 1981, pp. 9–17.

Brooks, C., "Experiences with Electronic Software Distribution", USENIX Summer Conference, Portland, Oregon, Jun. 11–14, 1985, pp. 433–436.

Leiss, E., "On Authorization Systems with Grantor–Controlled Propagation of Privileges", CompCon 83, San Francisco, CA, Feb. 28–Mar. 3, 1983, pp. 499–502.

Houy, T., "The Challenge of Selling Software on the Internet", Electronic Software Distribution: White Paper, http://www.elan.com/corp/esd.htm, Nov. 4, 1997, pp. 1–6.

IFOR/LS and EZ–LoK FAQ Product Information, http://www.gradient.com/support/techfaq/ifor/ezlok/ezprod.htm, Nov. 7, 1997, pp. 1–3.

Harper, Jr., R., "Software Licensing For Installations With Multiple Microcomputers", Abstract No.: C86000243, Computers & Education, 1985, vol. 9, No. 3, 1 page.

Cooper, F. et al., "Software Protection and Pricing in a LAN Environment", Abstract No. C86032120, Jurimetrics Journal, Winter 1986, vol. 26, No. 2, 1 page.

Rainbow Technologies, "Sentinel License Manager—Getting Started—for Windows TCP/IP and Novell NetWare—Release 5.0", 1997, pp. i–v, 1–24.

Rainbow Technologies, Notice for SentinelLM 5.0 UNIX Customers, 1997, 1 page.

Rainbow Technologies, "Sentinel License Manager—Integrator's Guide for NetWare—Release 5.0", 1997, pp. i–vi to IN–10.

Rainbow Technologies, "Sentinel License Manager—System Administrator's Guide for NetWare—Release 5.0", 1997, pp. i–1 to IN3.

Rainbow Technologies, "Sentinel License Manager—Reference Manual—Release 5.0", 1997, pp. i–1 to IN12.

Rainbow Technologies, "Sentinel License Manager—Integrator's Guide for UNIX—Release 5.0", 1997, pp. i–1 to IN10.

Rainbow Technologies, "Sentinel License Manager—System Administrator's Guide for INIX—5.0", 1997, pp. i–1 to IN4.

Rainbow Technologies, "Sentinel License Manager—Integrator's Guide for Windows TCP/IP—Release 5.0", 1997, pp. i–1 to IN12.

Rainbow Technologies, "Sentinel License Manager—System Administrator's Guide for Windows TCP/IP—Release 5.0", 1997, pp. i–1 to IN3.

Rainbow Technologies, "Sentinel License Manager—Integration Guide—Release 6.0", 1998, pp. i to 130.

Rainbow Technologies, "Sentinel License Manager—Programmer's Reference Manual—Release 6.0", 1998, pp. i to 187.

Rainbow Technologies, "Sentinel License Manager—System Administrator's Guide—Release 6.0", 1998, pp. i to 62.

Rainbow Technologies, "Notice for SentinelLM 6.0 UNIX Customers", Mar. 6, 1998, pp. 1, 2.

Rainbow Technologies, "SentinelLM License Management System, Release 6.1, Release Notes", Jan. 15, 1999, pp. 1–7.

Rainbow Technologies, "Sentinel Engineering Product Release Notes, SentinelLM License Management System", Version No. 6.1, Aug. 13, 1998, pp. 1–7.

Rainbow Technologies, "Notice for SentinelLM 6.1 UNIX Customers", Sep. 18, 1998, pp. 1, 2.

Rainbow Technologies, "SentinelLM License Manager, System Administrator's Guide, Release 6.1", 1998, pp. i–61.

Rainbow Technologies, "SentinelLM License Manager, Developer's Integration Guide, Release 6.1", 1998, pp. i–164.

Rainbow Technologies, "SentinelLM License Manager, Evaluation Guide, Release 6.1", 1998, pp. i–23.

Rainbow Technologies, "SentinelLM License Manager, Programmer's Reference Manual, Release 6.1", 1998, pp. i–191.

Rainbow Technologies, "SentinelLM License Manager, SentinelLM Developer's Guide, Release 6.1", 1998, pp. i–127.

Rainbow Technologies, "Notice for SentinelLM UNIX Customers: Installing from CD", Feb. 26, 1999, pp. 1, 2.

Rainbow Technologies, SentinelLM License Management System, Release 6.2, Release Notes, Feb. 12, 1999, pp. 1–11.

Rainbow Technologies, "Notice for SentinelLM 6.1 UNIX Tandem Customers", Feb. 16, 1999, pp. 1, 2.

Rainbow Technologies, "Notice for SentinelLM 6.1 UNIX Customers", Sep. 23, 1998, pp. 1, 2.

Elan Computer Group, "Comparing Elan License Manager with other software license managers", White Paper, Jun. 15, 1995, pp. 1–5.

Elan Computer Group, "Elan License Manager, Questions and Answers", 8/95, G 0002556–0002562, pp. 1–6.

Elan Computer Group, "Elan License Manager, Technical Overview", Jul. 1995, G 0002546–0002555, pp. 1–9.

Elan Computer Group, "Elan License Manager, Integrator's Guide for Windows, Release 5.0", rev. Jan. 31, 1997, ELAN 002589–002597, pp. i–viii.

Elan Computer Group, "Elan License Manager, System Administrator's Guide for Windows, Release 5.0", rev. Jan. 31, 1997, ELAN 002598–002602, pp. i–iv.

Elan Computer Group, "Elan License Manager, Reference Manual, Release 5.0", rev. Jan. 31, 1997, elan 002603–002609, pp. i–vi.

Common Licensing API, "License Service Application Programming Interface, API Specification v1.02", Jan. 28, 1993, RTI 3389–3413—pp. i–22.

Auto–Trol Technology Corp., "Auto–Trol Software Protection Installation Guide", Apr. 4, 1986, FF00016–00025, 10 pages.

Elan Computer Group, Elan License Manager Technical Overview, Nov. 13, 1997, ELAN 001702–001757, pp. 1–9, 1–2, i–iii, 1–44.

Highland Software, Inc., "FLEXlm End User/Programmers Manual", Mar. 8, 1991, BP 00022–BP 00037, pp. 1–3, 9–11, 19–21, A1–A3, 45, 61, 62, 84, 85.

Auto–Trol Technology Corp., "FLEXlm Programmers Guide, Dec. 1994", BP 00098–000137, pp. 1–36, 1–4.

Highland Software, Inc., "FLEXlm License Manager, Technical Overview", Oct., 1991, 8 pages.

Globetrotter Software, Inc., FLEXlm Programmers Guide for Windows, Version 5.11, Mar. 1997, RTI 5219–5290, pp. i–65.

Globetrotter Software, Inc., FLEXlm End User Manual, Version 6.0, Oct. 1997, RTI5129–5217, pp. 1–80.

Globetrotter Software, Inc., FLEXlm Reference Manual, Version 6.0, Dec. 1997, RTI5291–5508, pp. i–206.

Globetrotter Software, Inc., FLEXlm Reference Manual, Version 6.1, Jan. 21, 1999, RTI5509–5942.

PCT International Search Report as issued in International Application No. PCT/US00/24359, Mailing Date Aug. 2, 2001.

* cited by examiner

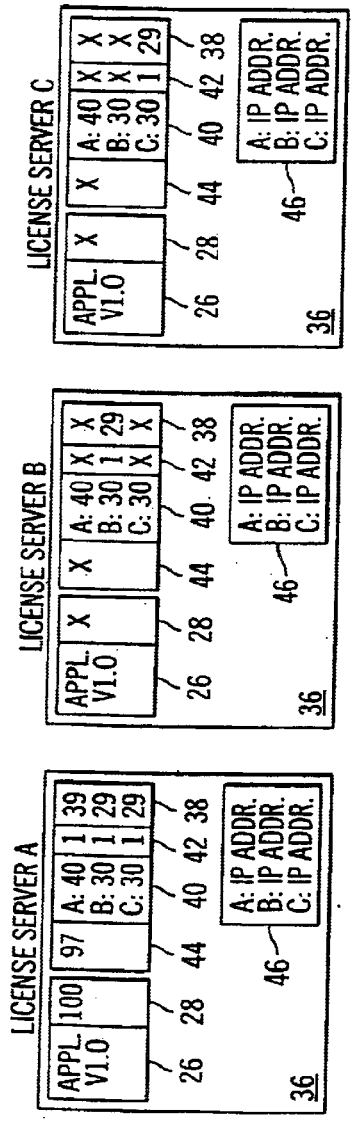
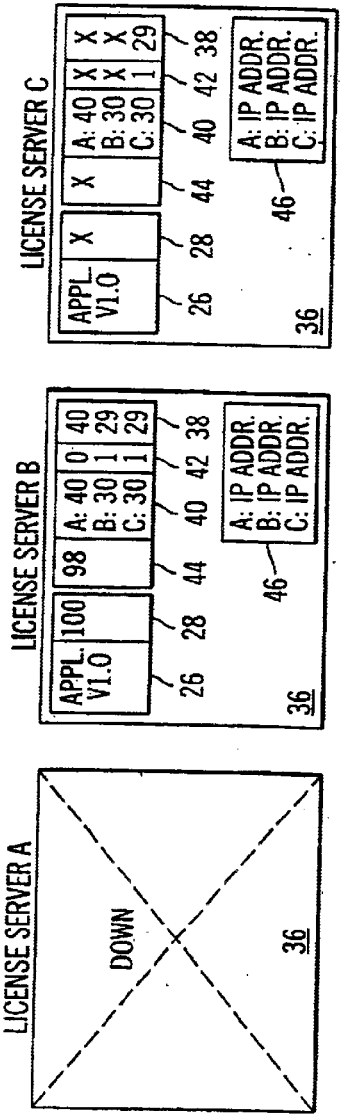
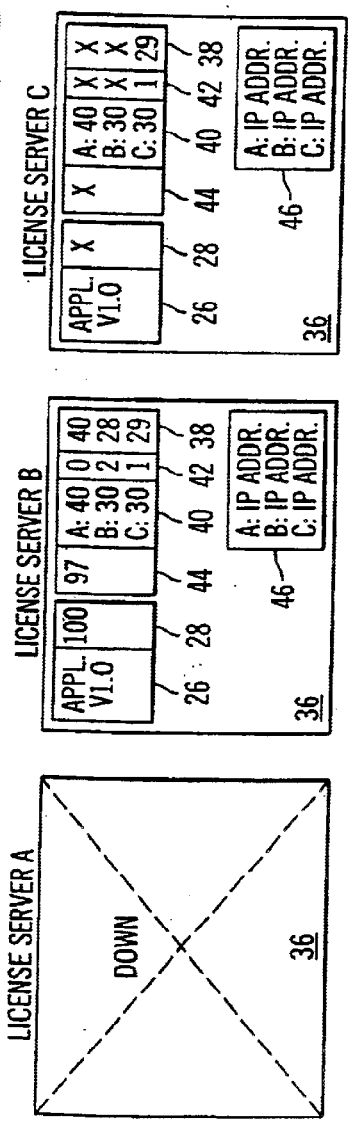
FIG. 8
FIG. 9
FIG. 10

SYSTEM AND METHOD FOR SELECTING A SERVER IN A MULTIPLE SERVER LICENSE MANAGEMENT SYSTEM

CROSS-REFERENCE TO RELATED APPLICATIONS

Embodiments of the present invention claim priority from Provisional Application Ser. No. 60/152,785, filed Sep. 7, 1999, and are related to U.S. utility patent applications entitled "License Management System And Method With Multiple License Servers", Ser. No. 09/648,697, filed Aug. 25, 2000; "License Management System And Method With License Balancing", Ser. No. 09/648,720, filed Aug. 25, 2000; and "License Management System And Method For Commuter Licensing", Ser. No. 09/648,502, filed Aug. 25, 2000. The contents of each of these applications are incorporated by reference herein.

BACKGROUND OF THE INVENTION

1. Field of the Invention

The present invention relates, generally, to license management systems and processes for managing licenses on a computer network and, in preferred embodiments, to such systems and processes involving a pool of license servers for managing software licenses among one or more users on the network, and for selecting a license server to either act as a leader server or from which to seek authorization to run a protected software program.

2. Description of Related Art

The increasing popularity of computer usage in homes and businesses, as well as in governmental, research and education institutions, has brought about a world-wide demand for greater software variety and sophistication. Indeed, the software development industry in most industrialized countries has shown substantial growth in recent years and is expected to show continued growth through the next decade.

However, as software sophistication increases, development costs associated with such software also tend to increase. Modern software programs can require months or even years of development, often involving expensive resources and teams of highly skilled engineers and programmers, before a product may be readied for sale or license. Thus, software development companies are often required to make large investments early in the development of their products, in the hope that the products will provide a volume of sales or license revenues sufficient to cover their development investments and generate profits.

Illegal software usage and piracy have become a significant problem to software development companies. Because of the nature of computer software, illegal usage and illegal copying of proprietary software programs can be difficult to detect or deter. The increasing usage of computer networks has added to the problem. Computer networks can allow multiple users to access and copy software stored by a common network program server or copy and pass software between each other, over the network. A legitimately purchased or licensed copy of a software program available on a network could result in many illegitimate usages or copies by unauthorized or unlicensed users having access to the network.

Various forms of encryption techniques have been developed to inhibit usage of encrypted software by unauthorized users that do not possess a decryption program or key. However, such techniques typically require each authorized users to obtain or be passed a decryption program or key, in advance of usage of the encrypted program. Accordingly, such techniques can be prohibitively inconvenient for some computer and network environments, where it is difficult or impractical to supply each authorized user with a decryption program or key or to decrypt a program for each user or usage.

Other software protection techniques have required legitimate or authorized users to have a special hardware device or circuit installed in or plugged into their computer, prior to usage of the protected software. See, e.g., U.S. Pat. No. 4,446,519 to Thomas. Again, such techniques can be prohibitively inconvenient for some computer and network environments. For example, if the network environment is such that the authorized user must use multiple computers on the network, then each computer must be provided with the special hardware device. Moreover, if the environment is such that computers having the special hardware device are not located in secure facilities, then unauthorized users may be able to access the protected software by using the non-secure computer in which the special hardware device is installed.

Accordingly, more sophisticated license management software has been developed for managing software licenses for computer networks, which do not require encryption of the protected software or special hardware devices in each authorized user's computer. For example, the assignee of the present invention, Rainbow Technologies, Inc., has marketed versions of a license management system under the trademark, SENTINELLM™. The SENTINELLM™ systems operate with a license server connected to a network of users. The license server stores and manages software licenses for the network users, in accordance with a license management program stored on the server. Each copy of a protected software program on the network is accompanied by a program code corresponding to a shell (also known as "wrapper") or library of Application Program Interface (API) functions, which communicates with the license management program on the server. When a user starts to run the protected software program, the shell code or library of API functions provided with the program communicates a request to use a license to the license server, over the network. The server, under the control of the license management software, responds to the request to determine whether it is storing an available license for the protected software program. If so, the server communicates an authorization message to the user and decrements a count of available licenses stored by the server. If not, the server communicates another message to the user, indicating that no licenses are available. In this manner, licenses are always stored and managed on a network license server. Each network user may have a copy of a protected software program, but must communicate with the license server for authorization to use the protected program.

License management systems which employ a license server, as discussed above, provide significant advantages with respect to the freedom to readily add, delete or change authorized users on the network, and the ability to readily control and alter licensing schemes (for example, to add or delete licenses or change conditions for licenses) by modifying only the license server files or programs. However, if all licenses are stored and managed in a single license server, failure of that server can result in a failure of the entire license management system. Accordingly, prior versions of the SENTINELLM™ systems include multiple license server capabilities, wherein two or more license servers are provided on the network, each having a pre-loaded license file and a license management program. One of the servers may be designated as a primary license server, while the others are designated as backup servers. If the primary server cannot be reached by a user, for example, because the primary server has crashed or otherwise gone down, the user may then communicate with a backup server to obtain an authorization message. The backup server, having a preloaded copy of the license file and the license management program, may then take over the license management functions.

Alternatively, in other prior versions of SENTINELLM™ systems, a shell program or library of API functions could be configured to send a general poll to all servers coupled to the communication channel on which the poll is sent. In response to a general poll, any server computer having a license file containing license information corresponding to the protected software program (whether or not the license information indicated that a license is available) would send a reply to the requesting client computer. The shell program or library of API functions associated with the requesting client computer would then respond to the first reply received from a license server having a license file storing license information for the protected software program. If the replying license server contains an available license for the protected software program, the replying license server provides an authorization message to the requesting client computer. If the replying license server does not contain an available license for the protected software program, the replying license server provides a message to the requesting client computer indicating that authorization to run the protected software program has not been granted. Such a system provides a degree of protection against system failure, in the event that one of the license servers crashes or goes down. The down server computer would not respond to the poll, but other server computers having appropriate license information in their license file would respond to the poll, thus, allowing the client computer to continue to seek authorization to run the protected software program, even though one of the servers was down.

While the above SENTINELLM™ systems have operated well in many contexts, each license server operates somewhat independent of other license servers. Accordingly, there is a need in the industry for improvements in connection with management and coordination of multiple license servers (or a pool of license servers) in software license management systems for computer networks.

SUMMARY OF THE DISCLOSURE

Therefore, it is an advantage of embodiments of the present invention to provide a license management system and method for managing licenses on a network using multiple license servers that allows a particular license server on a particular subnet to be selected by the network administrator to operate as the leader server due to its physical location, speed, or efficiency.

It is a further advantage of embodiments of the present invention to provide a system and method for managing licenses on a network using multiple license servers that allows a client computer to determine which is the best license server from which to seek authorization to run the protected software program, thereby balancing the license management load such that the number of available allocations (for a given protected software program, feature or version) can be adjusted to achieve an optimal distribution for each license server in the pool.

These and other advantages are accomplished according to a system for managing licenses for protected software on a communication network. The system comprises at least one client computer and a pool of license servers coupled to the communication network. The client computers request authorization to use the protected software, and the pool of license servers manage a distribution of allocations to use the protected software. The pool of license servers includes a selected current leader server for managing the distribution of allocations for all license servers in the pool. The first license server to be started is selected as the current leader server. However, if no license server is started first, the license server with the highest priority according to a leader priority list is selected as the current leader server. In addition, client computers seeking authorization to use the protected software may receive information from the server pool and select a particular license server from which to request authorization based on the received information.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 8 is a generalized representation of the distribution tables of leader server A and follower servers B and C in a server pool comprising three license servers in the example of FIG. 7 after an authorization to run the protected software program has been granted by leader server A according to an embodiment of the present invention.

FIG. 9 is a generalized representation of the distribution tables of license servers A, B and C in a server pool comprising three license servers in the example of FIG. 8 after old leader server A has gone down and follower server B has been elected as the new leader server according to an embodiment of the present invention.

FIG. 10 is a generalized representation of the distribution tables of license servers A, B and C in a server pool comprising three license servers in the example of FIG. 9 after the client computer that formerly received an authorization to run the protected software program from old leader server A has now received authorization from new leader server B according to an embodiment of the present invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Preferred embodiments of the invention relate to a system and process involving a pool of license servers for managing licenses to, for example, one or more protected software programs, files or other data structures, among one or more users on the network. Protected software may include, but is not limited to, for example, a software program, such as a word-processing program, a graphics program, a computer game, etc., a proprietary file or other data structure, such as a data-base or other form of data, as well as other software encoded information or instructions, for which the control of user access is desired. For purposes of simplifying the present disclosure, the protected software used in the following examples is one or more proprietary software programs.

According to a preferred embodiment of the present invention, the plurality of license servers are managed in accordance with a server pool scheme, as controlled by a license management program associated with each license server computer and the shell program or library of API functions associated with each copy of the protected software program. In preferred embodiments, the pool of license servers comprises three to 11 servers. However, it should be noted that alternative embodiments of the present invention are not limited to any particular maximum number of license servers. In addition, in further alternative embodiments, multiple pools of license servers can reside on a single network. However, for purposes of illustration only, embodiments of the present invention will be described herein with reference to a pool of three license servers.

Figure 1:
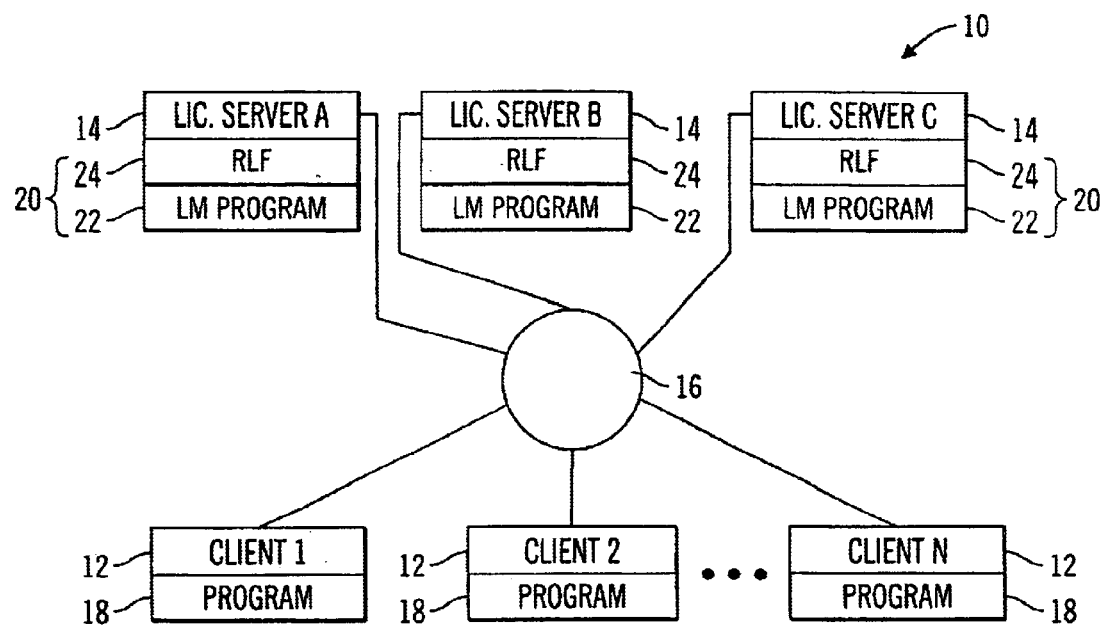
FIG. 1 is a generalized block diagram representation of an example network environment according to an embodiment of the present invention.

An example hardware environment for an embodiment of the present invention is illustrated, generally, in FIG. 1. With reference to FIG. 1, a computer network 10 includes a plurality of user or client computers 12 and three license servers 14, each coupled for communication over a communication network link, generally referenced at 16. The plurality of client computers 12 are identified as "Client 1", "Client 2", and "Client N", and the plurality of license servers 14 are labeled as "Lic. Server A", "Lic. Server B", and "Lic. Server C." Embodiments may employ any suitable number of client computers 12 and any suitable number of license servers 14. Also, while not shown in FIG. 1, the network 10 may include additional components, including one or more program or file servers, routers and/or other well known network devices and resources.

Each client computer 12 preferably includes a suitable processor and associated transient memory, such as an RAM, for running a protected software program. The client computer may be part of a standard personal computer (PC), network terminal, workstation or the like. In one preferred embodiment, each client computer 12 is coupled to a persistent program storage memory device 18, which may include, but is not limited to, a hard disc drive, floppy disc drive, tape drive, CD-ROM or the like, having a computer readable medium on which the protected software program is stored. Also stored with the protected software program is additional program code, such as code corresponding to a shell or library of API functions as discussed above, for communicating with the server computers which are under control of a license management program, in accordance with communication functions discussed below.

Each license server 14 preferably includes a suitable processor and associated transient memory, such as an RAM, for running a license management program as described herein. In addition, each license server 14 is coupled to one or more persistent program storage memory devices 20, which may include, but is not limited to, a hard disc drive, floppy disc drive, tape drive, CD-ROM or the like, having a computer readable medium on which a license management program 22 and a redundant license file (RLF) 24 are stored.

Figure 2:
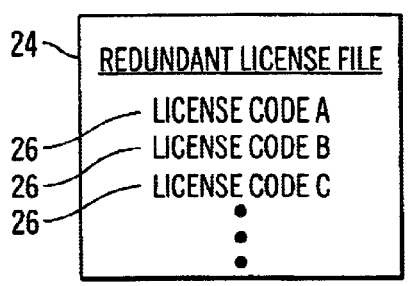
FIG. 2 is a generalized representation of a redundant license file (RLF) for the network environment of FIG. 1 according to an embodiment of the present invention.

An example embodiment of an RLF 24 is shown in FIG. 2 as containing license codes 26 for proprietary software programs A, B, C, etc. Each license code 26, in one example embodiment, comprises a string of data relating to license policy and the software program to which the license policy applies. In preferred embodiments, license codes 26 for software produced by more than one vendor may reside within the same RLF 24 of the same license server 14, and can be managed with a single process (execution of the license management software) running on a single license server 14. Thus, any given licenser server 14 does not need to have multiple license management processes running to manage licenses for multiple protected vendor applications. Instead, only one license management program needs to be running on a given license server 14, to manage licenses for protected vendor applications managed by that license server.

Figure 3:
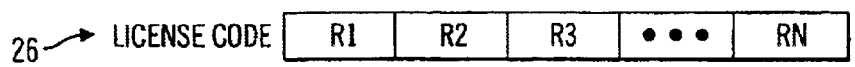
FIG. 3 is a generalized representation of a license code contained in an RLF of FIG. 2 according to an embodiment of the present invention.

In the example embodiment of FIG. 3, a license code 26 comprises a data string defining multiple records or fields R1, R2, R3 . . . RN, wherein each record corresponds to an attribute associated with the license policy, the software program to which the license policy applies, or other information. In preferred embodiments, each license code 26 includes at least one attribute associated with a license policy, the number of allocations for using the protected software program, and at least one other attribute associated with the identity of the protected software program. The number of allocations for using the protected software program is the maximum number of users that can be running the protected software program at any one time, and is also referred to as the ceiling or hard limit. Data associated with a license policy preferably includes data representing the expiration date or expiration time of the license, as granted by the licensee (e.g., the protected software program's owner or developer).

Figure 4:
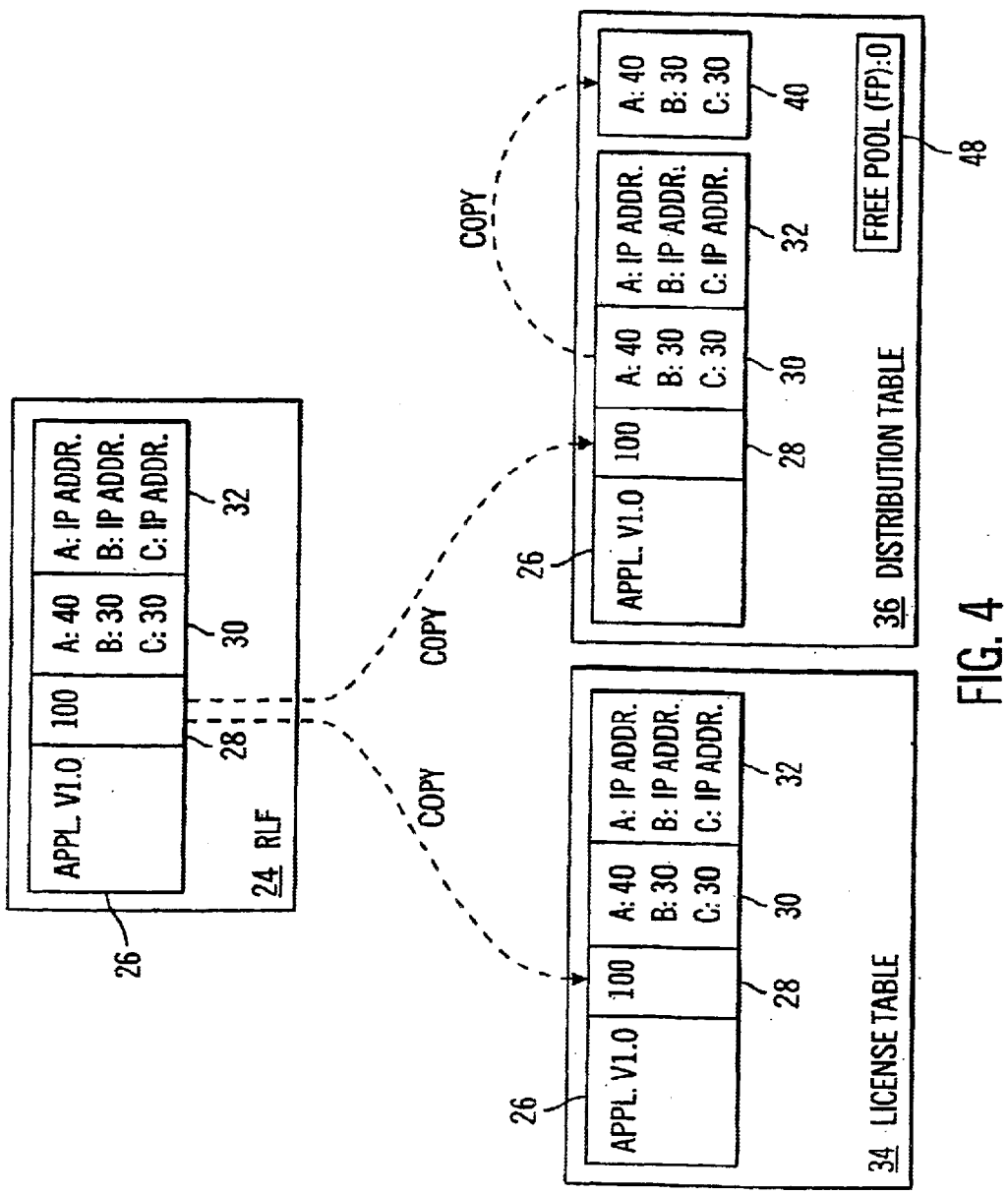
FIG. 4 is a generalized representation of a license code contained in an RLF and copied into a license table and a distribution table within a single license server for the network environment of FIG. 1 according to an embodiment of the present invention.

For purposes of illustration only, in the example of FIG. 4 only one fictional license code 26, identified as "Application v1.0," is stored in the RLF 24 of a license server 14, with a hard limit of 100 total allocations distributable across all license servers 14 (see reference character 28). In preferred embodiments, another attribute of the RLF 24 is the IP address 32 for each license server 26. Another attribute of the RLF 24 is the distribution of the 100 allocations across all the license servers 14. This distribution is identified as the initial distribution 30, and is configurable by the network administrator. In the example of FIG. 4, an initial distribution 30 of A:40, B:30, C:30, indicates that 40 allocations will initially be assigned to license server A, 30 allocations will initially be assigned to license server B, and 30 allocations will initially be assigned to license server C. This initial distribution 30 also signifies that the pool will comprise three license servers. If the network administrator makes an initial distribution that does not equal the hard limit of allocations (see reference character 28), in preferred embodiments of the present invention the extra allocations will be put into a free pool 48 maintained within the distribution table 36. If, on the other hand, the network administrator makes no initial distribution 30 of allocations in the RLF 24, preferred embodiments will divide the allocations evenly over the number of servers in the pool, and any extras will be put in the free pool 48. For example (but not illustrated in FIG. 4), if no initial distribution 30 was assigned by the network administrator, information representing an even distribution of A:33, B:33, and C:33 would be stored in the initial distribution attribute 30 of the RLF 24, and when a particular license server 14 is started, the RLF 24 would load an even distribution of A:33, B:33, and C:33 into the current distribution attribute 40 of distribution table 36, and would load a value of one into the free pool 48.

In preferred embodiments of the present invention, each RLF 24 stored in each license server 14 is an exact copy of every other RLF 24 of license servers in the pool. Thus, attributes of the license code 26 such as the expiration date or number of allocations need not be passed between license servers 14 in response to a request for authorization to use a protected software program from a client computer 12, because an exact copy of the license code 26 has already been stored on the hard disk of each license server 14 prior to the startup of that license server 14.

Each license server 14 operates, under the control of its associated license management program 22, to perform license management functions in association with data contained in the RLF 24, as described herein. Thus, when a particular license server 14 is started, the license server 14 loads the contents of its RLF 24 into a license table 34 in RAM or other memory and reads the license table 34, which identifies that server as a license server 14. It should be noted that in preferred embodiments, the license table 34 is never modified. In addition, the contents of the RLF 24 is loaded into a distribution table 36 in RAM or other memory, and the initial distribution 30 is further copied into another record, distinct from the license code 26, identified as a current distribution 40. Unlike the license table 34, the distribution table 36 changes its current distribution 40 over time to keep track of current allocations.

In preferred embodiments of the present invention, when the license servers 14 in the server pool are first started up, the first license server 14 to come on line is designated as a leader server. The leader server always has a global picture of the current distribution of allocations within every license server 14 in the server pool. If none of the license servers 14 were definitively started first, the license server 14 having a higher priority as established by a leader priority list will be designated the leader server. The leader priority list is stored in the RLF 24 and is read at the time of server startup. This is known as a leader election process. All other license servers 14 are designated as follower servers.

The ability to intentionally start up a particular license server 14 and force it to be the leader server is advantageous because it may be desirable for a particular license server 14 on a particular subnet to operate as the leader server due to its physical location, speed, or efficiency. In prior art systems, the leader server always had the highest IP address, and to change leader servers required physically reconnecting to a different address or reconfiguring the license servers by changing the IP address. In embodiments of the present invention, however, the leader server may be changed simply by turning a particular license server 14 on first.

Figure 5:
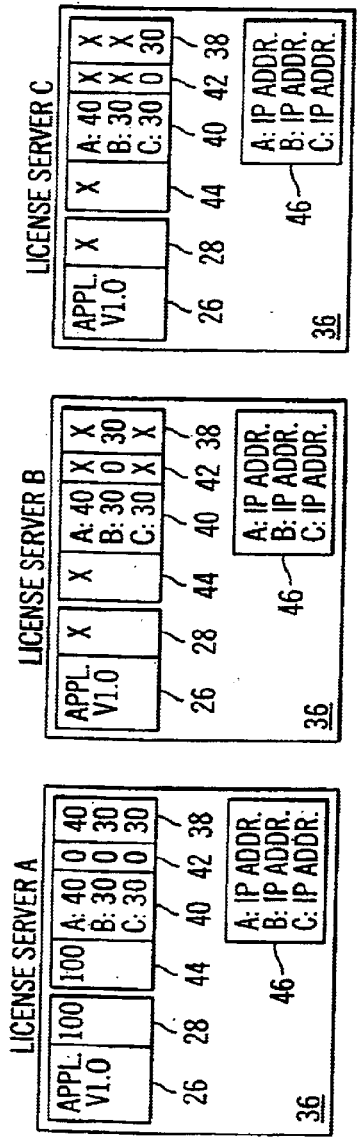
FIG. 5 is a generalized representation of an initial state of the distribution tables of leader server A and follower servers B and C in a server pool comprising three license servers according to an embodiment of the present invention.

For purposes of illustration only, FIG. 5 illustrates an example of the distribution tables 36 for a three server pool consisting of license servers A, B, and C. Assume, for this illustration, that all three license servers have been started up, and that license server A has been designated as the leader server, and B and C as the follower servers. Further assume that the hard limit of allocations for the software program Application v1.0 is 100, as indicated by the hard limit record 28 associated with the license code 26 for Application v1.0 within each distribution table 36. In addition, assume that the current distribution of allocations is 40 on leader server A, 30 on follower server B, and 30 on follower server C, as indicated in the current distribution record 40 associated with the license code 26 for Application v1.0 within each distribution table 36.

Note also that in the embodiment of FIG. 5, associated with each license code 26 is a record for available allocations for each server in the pool (see reference character 38), a record for available allocations for all servers in the pool (see reference character 44), and a record for allocations currently in use for each server in the pool (see reference character 42). The allocations in these records are values which are incremented or decremented as authorizations are issued, returned, or borrowed. It should be understood that the records identified by reference characters 28, 38, 40, 42, and 44 in FIG. 5 are associated with a particular license code 26, but are distinct from it.

As indicated in FIG. 5, in preferred embodiments of the present invention the structure of the distribution tables 36 will be the same for both the leader server A and follower servers B and C, but only the distribution table 36 for leader server A (the leader distribution table) will reflect the allocation status of the other license servers 14 in the server pool. In contrast, the distribution tables 36 for follower servers B and C (the follower distribution tables) will only reflect the allocation status of that particular follower server, as indicated by the X (don't care) designations in portions of the follower distribution tables.

When a user at a client computer 12 desires to run Application v1.0 from a follower server, such as follower server B, for example, the client computer 12 may first load some or all of the protected program into the transient memory of the client computer 12, along with the program code corresponding to a shell or library of API functions. Alternatively, the protected program may remain in persistent memory 18 until and unless the server computer communicates an authorization signal to the shell program or library of API functions. Loading of the shell program or library of API functions is preferably transparent to the user on the client computer 12 and, preferably, occurs in response to the user inputting a command to open the protected software (for example, by clicking a mouse button on an icon associated with the protected software).

As part of the function of the shell or library of API functions, a request is then sent from the client computer 12 to follower server B for one or more authorizations to run the protected program. For purposes of this example, assume that client computer 12 requested only one authorization.

Figure 6:
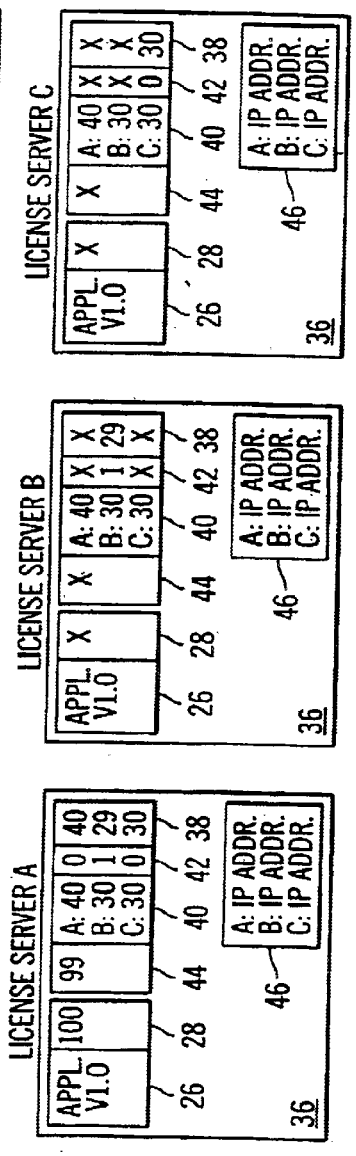
FIG. 6 is a generalized representation of the distribution tables of leader server A and follower servers B and C in a server pool comprising three license servers in the example of FIG. 5 after an authorization has been granted by follower server B according to an embodiment of the present invention.

Follower server B, under the control of the license management software, responds to the request by looking at its distribution table 36 to determine whether it has available allocations for Application v1.0. In the example of FIG. 5, follower server B has 30 allocations available, as represented by the available allocations record for each server in the pool (reference character 38) in the distribution table 36 for follower server B. Because it has available allocations, follower server B communicates an authorization message to the client computer 12. As illustrated in FIG. 6, once the authorization message is sent, the distribution table is updated so that the available allocations record 38 for follower server B decreases to 29, and the allocations in use record 42 for follower server B increases to one. If an insufficient number of allocations are available to completely satisfy the request, no authorizations are sent, and follower server B communicates another message back to the client computer 12, denying the request. In preferred embodiments, follower server B will then issue a borrow request in an attempt to borrow available allocations from another source. Borrowing is described in a related U.S. utility application entitled "License Management System and Method with License Balancing," Ser. No. 09/648,720, filed Aug. 25, 2000, the contents of which are incorporated by reference herein.

As noted above, in preferred embodiments of the present invention the leader server always has a global picture of the distribution of allocations in the whole server pool. Thus, any changes to the distribution table of follower server B must be communicated to leader server A. In preferred embodiments, follower server B can determine the IP address for the leader server A from a leader priority list 46, which is configurable by the network administrator. It should be noted that in preferred embodiments, the IP address of all license servers 14 in the server pool are stored in the leader priority list 46, a data structure separate from the license codes 26, to facilitate faster lookup. However, in alternative embodiments the IP addresses may be stored in a record associated with the license codes 26. In any case, after determining the IP address of the leader server A, follower server B communicates the fact that its available allocations count has dropped to 29 to leader server A, and the distribution table of leader server A will be updated accordingly. Thus, as illustrated. in FIG. 6, the distribution table 36 of leader server A reflects that the allocations available record 38 for follower server B has dropped to 29, the allocations in use record 42 for follower server B has increased to 1, and that the record for allocations available for all servers in the pool (see reference character 44) has dropped to 99.

Figure 7:
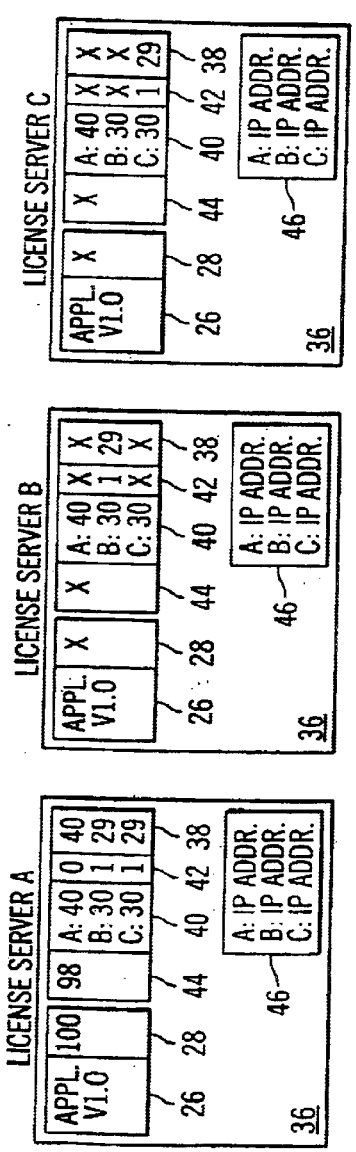
FIG. 7 is a generalized representation of the distribution tables of leader server A and follower servers B and C in a server pool comprising three license servers in the example of FIG. 6 after an authorization to run the protected software program has been granted by follower server C according to an embodiment of the present invention.

Similarly, if another client computer 12 requests authorization to run Application v1.0 from follower server C, follower server C will look at its distribution table 36, determine that it has 30 allocations available, and send an authorization back to the client computer 12. As illustrated in FIG. 7, once the authorization is sent, the available allocations record 38 for follower server C drops to 29, and the allocations in use record 42 for follower server C increases to one. This change is then communicated to leader server A, whose distribution table 36 will reflect that the available allocations record 38 for follower server C has dropped to 29, the allocations in use record 42 for follower server C has increased to one, and that the record for allocations available for all servers in the pool (see reference character 44) has dropped to 98. It should be noted in FIG. 7 that the distribution tables 36 for follower servers B and C keep track of changes to their own allocations, but do not keep track of changes to the allocations of other license servers.

In accordance with a further aspect of a preferred server pool embodiment, a client computer 12 seeking authorization to run a protected software program may first locate a plurality of license servers 14 on the network, and more preferably, locate all license servers 14 on the network. This may be accomplished with a general poll to all license servers 14 in the server pool. In response to the poll, each license server 14 provides the client computer 12 with information about that particular license server 14. Such information may be included in a reply message or in a subsequent message sent from each license server 14 to the client computer 12. Alternatively, each license server's reply may be merely the identity of the replying license server 14, wherein the client computer 12 employs the identity information received for each license server 14 as a key to a look-up table or database (not shown) to locate other information about each license server 14, such as, but not limited to, the license server's protocol support, the total number of client computers 12 currently connected to the license server 14, IP address, and the number of available allocations for a given protected software program. The look-up table or database may be stored in a persistent memory 18 associated with the client computer 12 or may be stored in other memory (not shown) accessible to the client computer 12 over the network 16.

With the license server information corresponding to a plurality of license servers 14 from which replies were received, the client computer 12, under the control of the shell program or library of API functions, determines which is the best license server 14 from which to seek authorization to run the protected software program. In preferred embodiments, the client computer 12 renders this determination based on a number of license server characteristics, such as, but not limited to protocol support, the total number of client computers 12 currently connected to the license server 14, IP address, and the number of available allocations for a given protected software program. Other factors may also be used in the determination, such as the location of the license servers 14 relative to the requesting client computer 12. In an alternative embodiment, the server computers 14 in the server pool determine which license server 14 is the best license server 14 for the request, for example, based on the above-noted characteristics or other factors.

By using information such as the total number of client computers 12 connected to each license server 14 and the number of available allocations in each license server 14 as part of the determination of which license server 14 is the best license server 14 to handle the request, the license management load can be balanced such that the number of available allocations (for a given protected software program, feature or version) can be adjusted to achieve an optimal amount for each license server 14 in the pool. Thus, for example, the determination of which license server 14 will handle a client computer's request to run a particular protected software program may be based, in whole or in part, on which license server 14 has the most available allocations. Alternatively, the determination may be based, in whole or in part, on a scheme which tends toward maintaining an equal number of available allocations in each active license server 14 in the pool, wherein license servers 14 having a higher than average or mean number of available allocations are favored over other license servers 14 in the pool. Yet a further alternative, the determination may be based on a scheme having a tendency to maintain a larger number of available allocations at license servers 14 that are expected to receive a higher volume of requests for authorization to run the particular protected software program, relative to other license servers 14 in the pool, for example, by favoring such other license servers 14 in the determination.

In embodiments of the present invention, the license servers 14 periodically communicate with (ping) each other so that the license servers 14 know which other license servers 14 are down or up. The communication, or pinging, may be in the form of a periodic signal (heartbeat) sent from the leader server to the follower servers. Server identification information, such as the IP address of the follower server, may be contained within this heartbeat, but license code information need not be communicated. If the leader server does not receive an acknowledgement (ack) from a particular follower server in response to the heartbeat within an expected period of time, the leader server will designate that follower server as being down. In addition, if a follower server does not receive a heartbeat from the leader server within an expected period of time, it sends a leader check message to the leader server to check if the leader server is still alive. If the leader server is alive, it will send an "ack" in response to the leader check message. If no "ack" is received, the follower server will start a leader election process to select a new leader server. In preferred embodiments, the preference order contained in leader priority list 46 is traversed until a functioning follower server with the highest priority is located. This follower server then becomes the new leader server. In alternative embodiments, the functioning follower server with the highest IP address is elected as the new leader server.

Continuing the example of FIG. 7 for purposes of illustration only, assume that a client computer A has requested and received authorization to run Application v1.0 from leader server A. As illustrated in FIG. 8, once the authorization is sent, the available allocations record 38 for leader server A drops to 39, the allocations in use record 42 for leader server A increases to one, and that the record for allocations available for all servers in the pool (see reference character 44) has dropped to 974. Thus, at this point in time, one client computer 12 is connected with each license server 14.

Now assume that leader server A goes down. Because all license servers 14 are periodically pinging each other, the two follower servers B and C will soon determine that leader server A has gone down. Further assume that follower server B is then elected as the new leader server. New leader server B will already have its own RLF 24, license table 34, and distribution table 36, which includes the current distribution of allocations 40. However, new leader server B does not have the global allocation information maintained by the old leader server A. Therefore, upon becoming the new leader server, new leader server B must now receive this information from the other license servers. As illustrated in FIG. 9, because old leader server A is now down, within the distribution table 36 for new leader server B, the allocations in use record for old leader server A (see reference character 42) is set to zero, and the available allocations record (see reference character 38) is set to 40. When new leader server B sends a heartbeat to follower server C, the heartbeat contains information which identifies B as the leader server. Follower server C will send an "ack" in response to the heartbeat from new leader server B, and in the process, will provide information on the allocations in use record and allocations available record for follower server C. Once, this information is received, within the distribution table 36 for new leader server B, the allocations in use record for follower server C (see reference character 42) is set to one, and the available allocations record (see reference character 38) is set to 29. In addition, the record for allocations available for all servers in the pool (see reference character 44) is set to 98. In this manner, new leader server B receives a global picture of the status of all license servers in the server pool.

Meanwhile, because client computers 12 connected to a particular license server 14 are also periodically communicating with each other using a regular heartbeat function that indicates that each is still functioning, client computer A will soon determine that server A went down. Client computer A knows that it has received authorization to use a protected software program from server A, and therefore knows that it must enter a fail-over mode and look for a new license server 14 from which to receive authorization. Because client computer A receives leader priority list 46 from a license server 14 whenever client computer A receives an authorization, client computer A knows the IP address of every license server 14 in the server pool. Client computer A then sends a heartbeat to the remaining license servers 14 in turn, in the order designated in leader priority list 46, until it finds the new server (B, in this example) with an available allocation.

In preferred embodiments of the present invention, each license server 14 maintains a key table containing a list of client computers 12 that currently have authorizations issued by that particular license server 14, even for non-redundant license codes. Thus, in the present example, when new leader server B receives a heartbeat from client computer A, new leader server B will determine from the key table that it did not previously issue an authorization to client computer A. Thus, new leader server B will convert the heartbeat to a request, and will reserve the requested number of allocations for client computer A, provided it has the requested number of allocations available. In this manner, as client computers 12 formerly connected to old leader server A locate and ping new leader server B, new leader server B will issue authorizations and accept the allocations of old leader server A. The distribution table 36 of new leader server B will then change accordingly. As illustrated in FIG. 10, once client computer A receives authorization from new leader server A, the distribution table for new leader server B will be updated such that the allocations in use record (see reference character 42) for leader server B is increased to two, and the allocations available record (see reference character 38) is decreased to 28.

In accordance with a further aspect of a preferred server pool embodiment, a client computer 12 in fail-over mode seeking authorization to run a protected software program may first locate a plurality of remaining functioning license servers 14 on the network, and more preferably, locate all remaining functioning license servers 14 on the network, rather than sending a heartbeat to the remaining functional license servers 14 in the order determined by the leader priority list. The location of all remaining functioning license servers 14 may be accomplished with a general poll to all license servers 14 in the server pool. In a manner similar to the selection of an optimal license server 14 by a client computer 12 seeking to obtain an authorization, the client computer 12 in fail-over mode may then select an optimal license server 14 after receiving information from all functioning license servers 14 in response to the general poll.

Therefore, embodiments of the present invention provide a system and method for managing licenses on a network using license servers that allows a particular license server on a particular subnet to be selected by the network administrator to operate as the leader server due to its physical location, speed, or efficiency. Embodiments of the present invention also allow a client computer to determine which is the best license server from which to seek authorization to run the protected software program, thereby balancing the license management load such that the number of available allocations (for a given protected software program, feature or version) can be adjusted to achieve an optimal distribution for each license server in the pool.

What is claimed is:

1. A system for managing licenses for protected software on a communication network, the system comprising:
   at least one client computer coupled to the communication network for requesting authorization to use the protected software; and
   a pool of license servers coupled to the communication network, each license server in the pool is programmed for communication with at least one client computer for managing a distribution of allocations for the at least one client computer to use the protected software, the license servers in the pool include a selected current leader server that is also programmed for managing the distribution of allocations for all license servers in the pool.

2. A system as recited in claim 1, the pool of license servers programmed for selecting the current leader server as the first license server to be started, and if no license server is started first, for selecting the license server with a highest priority as the current leader server according to a leader priority list.

3. A system as recited in claim 1, the pool of license servers programmed for communicating with each other and determining if the current leader server can no longer manage a distribution of allocations to use the protected software, and selecting the license server with the highest priority according to a leader priority list as a new leader server if it is determined that the current leader server can no longer manage a distribution of allocations to use the protected software.

4. A system as recited in claim 1, the at least one client computer programmed for selecting a license server from which to request authorization to use the protected software.

5. A system as recited in claim 4, the at least one client computer programmed for locating all functioning license servers in the pool, receiving information from those located functioning license servers, and selecting a license server from which to request authorization to use the protected software based on the received information.

6. A system as recited in claim 4, each client computer and each license server programmed for communicating a heartbeat between client computers that have received authorization to use the protected software from a particular license server and that particular license server; and
   each client computer that has received authorization to use the protected software from a particular license server programmed for determining whether that particular license server is still capable of managing a distribution of allocations to use the protected software;
   wherein each client computer that has received authorization to use the protected software from a particular license server also receives a leader priority list from that particular license server.

7. A system as recited in claim 6, wherein each client computer that has received authorization to use the protected software from a particular license server but has determined that particular license server is no longer capable of managing a distribution of allocations to use the protected software is programmed for selecting a new license server from which to request authorization to use the protected software.

8. A system as recited in claim 7, wherein each client computer that has received authorization to use the protected software from a particular license server but has determined that particular license server is no longer capable of managing a distribution of allocations to use the protected software is programmed for communicating with functioning license servers in the pool in an order determined from the leader priority list until a new license server from which to request authorization to use the protected software is selected.

9. A method for managing licenses for protected software on a communication network, the method comprising the steps of:
   coupling at least one client computer to the communication network for enabling the at least one client computer to issue a request for authorization to use the protected software;
   coupling a pool of license servers to the communication network, each license server in the pool is configured for communication with at least one client computer for managing a distribution of allocations for the at least one client computer to use the protected software; and
   selecting one of the license servers in the pool as a current leader server, the current leader server also configured for managing the distribution of allocations for all license servers in the pool.

10. A method as recited in claim 9, the step of selecting one of the license servers in the pool as the current leader server further including the steps of:
    selecting the current leader server as the first license server to be started; and
    if no license server is started first, selecting the license server with a highest priority as the current leader server according to a leader priority list.

11. A method as recited in claim 9, further including the steps of:
    determining, by communications within the pool of license servers, if the current leader server can no longer manage a distribution of allocations to use the protected software; and
    selecting the license server with the highest priority according to a leader priority list as a new leader server if it is determined that the current leader server can no longer manage a distribution of allocations to use the protected software.

12. A method as recited in claim 9, further including the step of selecting, by the at least one client computer, a license server from which to request authorization to use the protected software.

13. A method as recited in claim 12, the step of selecting a license server from which to request authorization to use the protected software further including the steps of:
    locating all functioning license servers in the pool;
    receiving information from those located functioning license servers; and
    selecting a license server from which to request authorization to use the protected software based on the received information.

14. A method as recited in claim 12, further including the steps of:
    communicating a heartbeat between client computers that have received authorization to use the protected software from a particular license server and that particular license server; and
    determining, for each client computer that has received authorization to use the protected software from a particular license server, whether that particular license server is still capable of managing a distribution of allocations to use the protected software; and communicating a leader priority list from that particular license server to each client computer that has received authorization to use the protected software from that particular license server.

15. A method as recited in claim 14, wherein for each client computer that has received authorization to use the protected software from a particular license server but has determined that particular license server is no longer capable of managing a distribution of allocations to use the protected software, the method further includes the step of selecting a new license server from which to request authorization to use the protected software.

16. A method as recited in claim 15, wherein for each client computer that has received authorization to use the protected software from a particular license server but has determined that particular license server is no longer capable of managing a distribution of allocations to use the protected software, the method further include the step of:

locating all functioning license servers in the pool;

receiving information from those located functioning license servers; and communicating with functioning license servers in the pool in an order determined from the leader priority list until a new license server from which to request authorization to use the protected software is selected.

\* \* \* \* \*